United States Patent [19]

Fink

[11] Patent Number: 4,621,853

[45] Date of Patent: Nov. 11, 1986

[54] UNIVERSAL GRIPPER APPARATUS FOR ROBOTIC DEVICE

[75] Inventor: Anton Fink, Searingtown, N.Y.

[73] Assignee: Metrology Systems Corporation, Plainview, N.Y.

[21] Appl. No.: 676,058

[22] Filed: Nov. 29, 1984

[51] Int. Cl.[4] .............................................. B25J 15/00
[52] U.S. Cl. ...................................... 294/88; 294/116
[58] Field of Search ................... 294/88, 95, 97, 106, 294/115, 116; 74/99 R, 99 A; 269/34, 218, 233, 234; 414/753; 901/31, 36, 37, 38, 39; 279/4, 121

[56] References Cited

U.S. PATENT DOCUMENTS

| | | | |
|---|---|---|---|
| 4,234,223 | 11/1980 | O'Neil | 294/116 |
| 4,492,400 | 1/1985 | Yuda | 294/88 |
| 4,507,045 | 3/1985 | Valentine et al. | 294/88 |

Primary Examiner—James B. Marbert
Attorney, Agent, or Firm—Anthony J. Casella; Gerald E. Hespos

[57] ABSTRACT

A gripper apparatus is provided for use with a robotic device. The apparatus includes a plurality of master jaws pivotally mounted to a housing and radially aligned with respect to one another. Appropriately shaped grippers are mountable on each master jaw. Rotational movement of the master jaws is effected by an actuator piston slidably disposed within the housing. The actuator piston is moved in response to hydraulic or pneumatic fluid selectively directed into the housing.

4 Claims, 7 Drawing Figures

UNIVERSAL GRIPPER APPARATUS FOR ROBOTIC DEVICE

BACKGROUND OF THE INVENTION

Chuck assemblies for securely holding and rotating a tool or workpiece are well know. The gripper members of these known chucks can be operated manually, hydraulically or pneumatically. One extremely efficient and effective fluid actuated chuck is shown in U.S. Pat. No. 4,349,207 which issued to Anton Fink on Sept. 14, 1982.

Although many prior art chucks are capable of effectively holding a tool or workpiece, these chucks tend to be complex and costly. At least part of this complexity is due to the need to provide an apparatus having jaws that are both radially movable to securely grasp the tool or workpiece, and that are rotatable for performing work.

Robotic devices recently have been developed to facilitate many manufacturing processes. For example, robotic devices may be used to advance an object from a storage bin to a work station. Similarly, robotic devices often are used to advance an object from one work station to the next. In other instances robotic devices are used to remove a tool from a tool holder and to selectively place an alternate tool in the tool holder. In still other instances robotic devices are used to hold and perform work with a tool. Specifically, robotic devices may hold and perform specific tasks with welding torches, spray guns or rivetting devices.

Typically robotic devices have included an arm or an interconnected array of arms which are operative to move according to a preselected and specially designed program of instructions. The end of this arm or array of arms has included a mechanism to grasp and hold the required tool or workpiece. These grasping mechanisms typically have utilized the technology developed in connection with chucks. In this respect, the grasping mechanisms that have been used with robitic devices have been effective in performing the required work, but also have been excessively complex and costly. More particularly, the grasping mechanisms used with robotic devices have relied upon a technology developed in connection with rotating tool or workpiece holders. However, robotic devices seldom require rotatable holding members. The known grasping mechanisms also have been deficient in that the operation of the mechanism often has been incorporated into or dependent upon the operation of the robotic device. This has limited the selection of mechanisms and operational methods that are available to users of robotic devices. Thus, a sophisticated robotic device could be made unnecessarily costly or inefficient for a specific function by virtue of its grasping mechanism.

In view of the above, it is an object of the subject invention to develop a simple gripping apparatus adapted for use with robotic devices, and which is inexpensive to manufacture.

It is another object of the subject invention to provide a gripping apparatus that can readily be mounted to any of a broad range of robotic devices.

It is an additional object of the subject invention to provide a gripping apparatus that is self contained and that can be activated independent of the operation of the robotic device.

It is a further object of the subject invention to provide an apparatus capable of securely grasping a wide variety of tools and workpieces.

SUMMARY OF THE INVENTION

The universal gripping apparatus of the subject invention is a self contained unit adapted to be removably mounted to the end of any robotic arm, and to be hydraulically or pneumatically operated by a fluid system independent of the robotic device.

The apparatus includes a plurality of generally planar master jaws radially aligned relative to one another. Each master jaw is pivotally mounted in a housing, such that the pivotal movement of each master jaw is entirely within the plane of that jaw.

Each master jaw is adapted to receive a gripper, the shape of which is dependent upon the specific work task to be carried out by the apparatus. The mounting of the grippers is such that the pivotal movement of the master jaws in their respective radially aligned planes causes the grippers to move toward or away from one another in radial drections. Thus, the pivotal movement of the master jaws can cause the associated grippers to either grasp or release a workpiece, tool or the like.

The pivotal movement of the master jaws is positively and directly caused by movement of an actuator means disposed within the housing. More particularly the master jaws of the subject apparatus are disposed within radially aligned channels in one end of the housing. Each master jaw is pivotally retained in its associated channel by a pivot pin extending perpendicular to the plane of the master jaw and passing through both the master jaw and adjacent portions of the housing.

The radially innermost portion of each master jaw defines a lever arm. An appropriate force exerted on each lever arm will cause the associated master jaw to rotate about its pivot pin. It follows that a single force directed simultaneously on the various lever arms will cause all master jaws in the apparatus to rotate about their pivot points. This simultaneous force on the plurality of lever arms is effected through an actuator means movably mounted in the housing. More particularly the actuator means may be a piston which includes one or more receptacles for receiving the lever arms. Thus, a movement of the actuator piston in thehousing can cause the simultaneous movement of the lever arms and a corresponding pivoting of each master jaw about its pivot pin.

This movement of the actuator means or piston relative to the housing preferably is carried out hydraulically or pneumatically, but can be entirely electromechanically operable. Thus, the actuator piston may be slidably mounted in a cavity extending into one end of the housing. This piston cavity may be securely sealed by a cover. Ports for hydraulic or pneumatic fluid may then extend into the cavity so as to be disposed on opposite sides of the actuator piston. The movement of the actuator piston then can be effected by controlling the flow of pneumatic or hydraulic fluid into or out of the ports in the housing. The movement of the actuator piston relative to the housing causes the lever arms to move, and in turn causes the master jaws to rotate about their respective pivot points. As explained above, the simultaneous pivotal movement of the master jaws causes the radially inward or outward movement of the grippers attached thereto.

DETAILED DESCRIPTION OF THE PREFERRED EMBODIMENT

Figure 1:
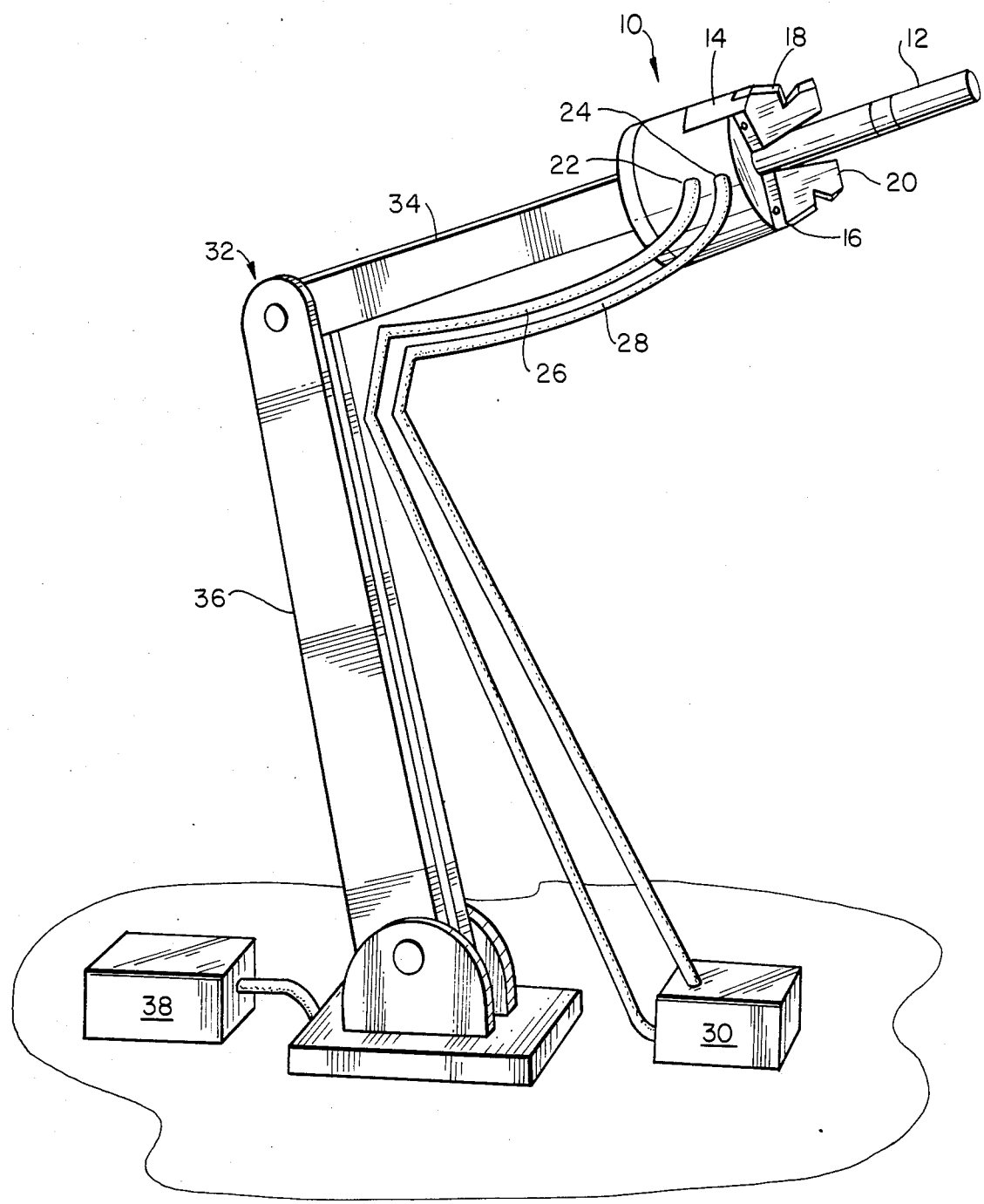
FIG. 1 is a schematic illustration of the gripper apparatus of the subject invention mounted to a robotic device.

The universal gripper apparatus of the subject invention is indicated generally by the numeral 10 in FIG. 1. The apparatus 10 is adapted to selectively grasp and release a workpiece or tool indicated generally by the numeral 12. More particularly the apparatus 10 includes a plurality of pivotally mounted master jaws 14 and 16 to which grippers 18 and 20 respectively are removably mounted.

As explained in greater detail below, the apparatus 10 is operable by hydraulic or pneumatic power. To this end, the apparatus 10 is provided with ports 22 and 24 to which tubes 26 and 28 are attached. The tubes extend from a source 30 of hydraulic or pneumatic fluid, and are adapted to selectively carry said fluid between the source 30 and the apparatus 10.

The apparatus 10 is adapted to be readily mounted on a robotic device which is schematically illustrated in FIG. 1 and identified by the numeral 32. The robotic device 32 typically will include a plurality of movable arms 34 and 36 the actions of which typically will be governed precisely by a control unit 38. It is important to note that the gripping or releasing actions of the apparatus 10 are controlled by the hydraulic or pneumatic source 30 which can be entirely independent of the robotic device 32 and its control 38. Thus, the self contained apparatus 10 can readily be used with any of a variety of robotic devices 32.

Figure 2:
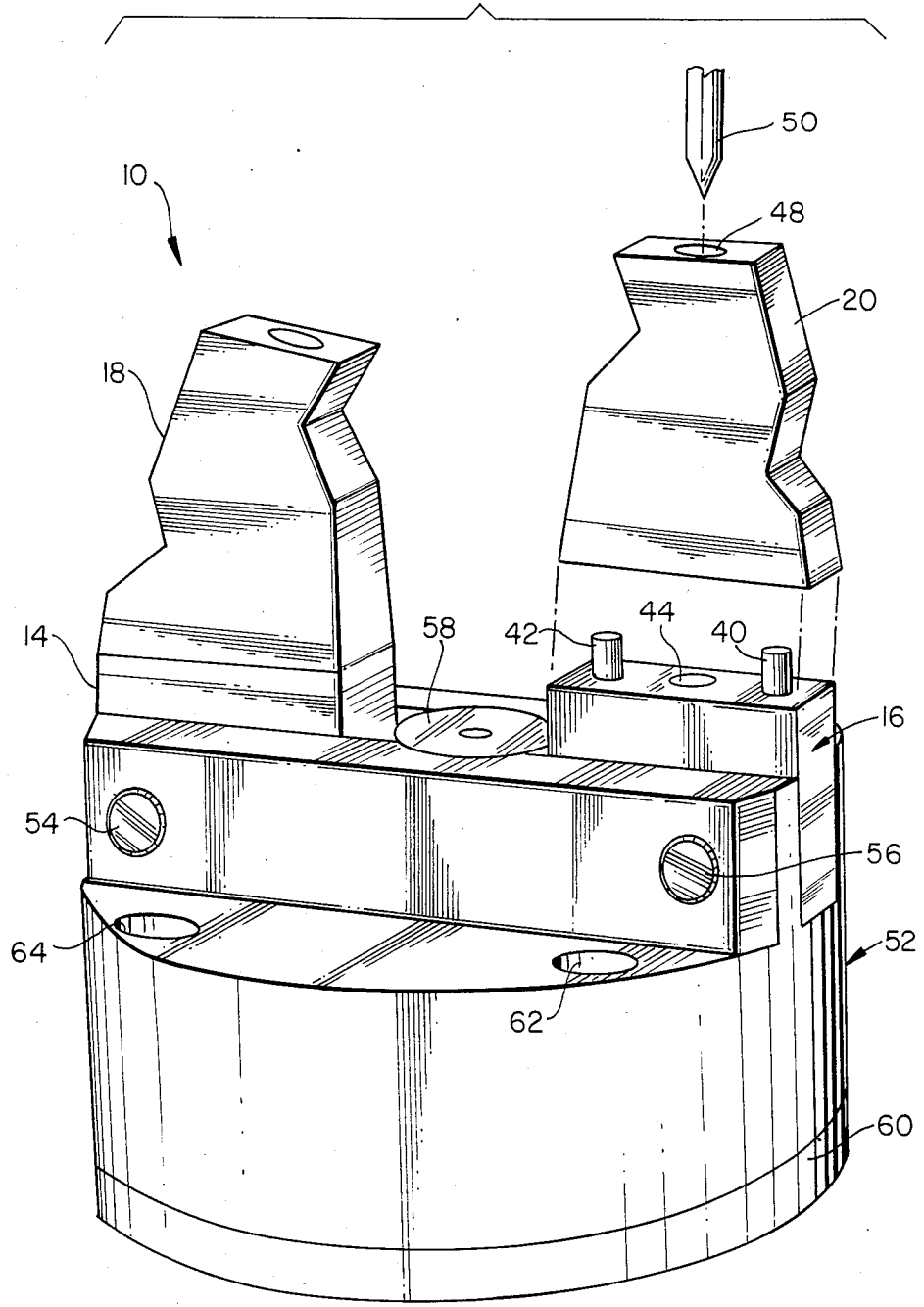
FIG. 2 is an exploded perspective view of a gripper apparatus of the subject invention.
Figure 3:
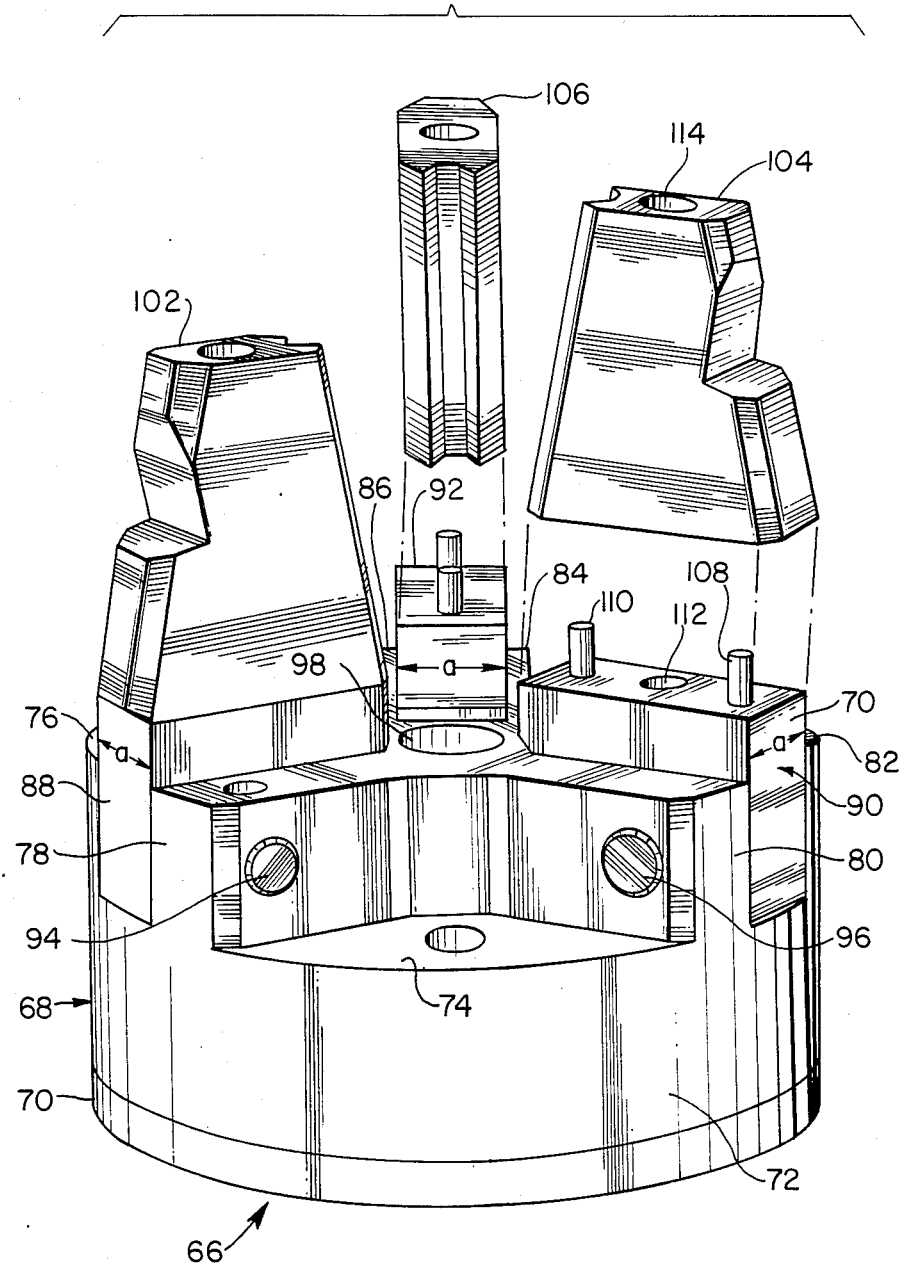
FIG. 3 is an exploded perspective view of an alternate gripper apparatus according to the subject invention.

Turning to FIGS. 2 and 3, two particular embodiments of the subject gripping apparatus are shown. Specifically, FIG. 2 illustrates in greater detail the gripper apparatus 10 depicted in FIG. 1. As noted above, the apparatus 10 includes pivotally mounted master jaws 14 and 16 to which gripper members 18 and 20 are removably attached. As shown with respect to master jaw 16, a pair of positioning dowels 40 and 42, are provided and are receivable in corresponding apertures (not shown) in the gripper member 20. The master jaw 16 further includes a threaded aperture 44 located substantially centrally between dowels 40 and 42. The gripper member 20 includes through aperture 48 which is disposed to be in line with the aperture 44 in the master jaw 16. Thus, the gripper member 20 can be fixedly but removably secured to the master jaw 16 by a threaded member 50.

The apparatus 10 further includes a generally cylindrical housing 52 in which the master jaws 14 and 16 are pivotally mounted. More particularly the master jaws 14 and 16 are adapted to be pivoted around pins 54 and 56 which in turn are secured in the housing 52. A piston actuator 58 also is mounted in the housing 52 and is adapted to move relative thereto, as explained in great detail below. The rear end of the housing 52 is enclosed by a cover 60 secured thereto by bolts (not shown). The apparatus 52 further includes mounting apertures 62 and 64 which enable secure but removable mounting of apparatus 10 on a robotic device.

The apparatus 10 generally is acceptable for gripping non-circular objects or for simply moving an object from one location to another. However, there are many instances where a circular object will have to be securely grasped, or where work conditions require a more secure grasping of an object. In these instances, it often will be necessary to employ a three jaw gripper apparatus 66 as depicted in FIG. 3. The apparatus 66 includes a generally cylindrical housing 68 to which a circular rear cover 70 is removably but securely attached. The housing 68 includes a cylindrical side wall 72 and a top wall 74 disposed substantially parallel to the rear cover 70 and perpendicular to the longitudinal axis of the housing 68.

The housing 68 further includes pairs of spaced apart parallel jaw guides 76 and 78, 80 and 82, and 84 and 86. The jaw guides 76-86 define three radially aligned jaw channels in which master jaws 88, 90 and 92 are pivotally mounted. More particularly, master jaw 88 is pivotally mounted to pivot pin 94 which extends through jaw guides 76 and 78, as well as through the master jaw 88. Similarly, master jaw 90 is pivotally mounted to pivot pin 96. The master jaw 92 is similarly mounted on a pivot pin (not shown). The master jaws 88-92 are substantially identical to one another and have a thickness indicated by dimension "a".

The pivoting movement of the master jaws 88-92 is positively and directly caused by a movable piston 98 slidably mounted in the housing 68. The specific construction of piston 98 is explained in greater detail below.

Grippers 102, 104 and 106 are removably but securely mounted to the master jaws 88-92. As illustrated with respect to the master jaw 90, each master jaw includes a pair of positioning dowels 108 and 110. The gripper 104 is provided with apertures (not shown) located and configured to receive the positioning dowels 108 and 110. Master jaw 90 further includes a threaded aperture 112, while the gripper 104 includes a through aperture 114. The apertures 112 and 114 are disposed to be in register with one another when the gripper 104 is mounted on the positioning dowels 108 and 110. A bolt or other threadable fastening means can be extended through apertures 114 and 112 to securely but removably fasten the gripper 104 to the master jaw 90. It should be noted, that the specific configuration of grippers 102-106 can vary widely depending upon the end use of which the apparatus 66 will be put.

Figure 4:
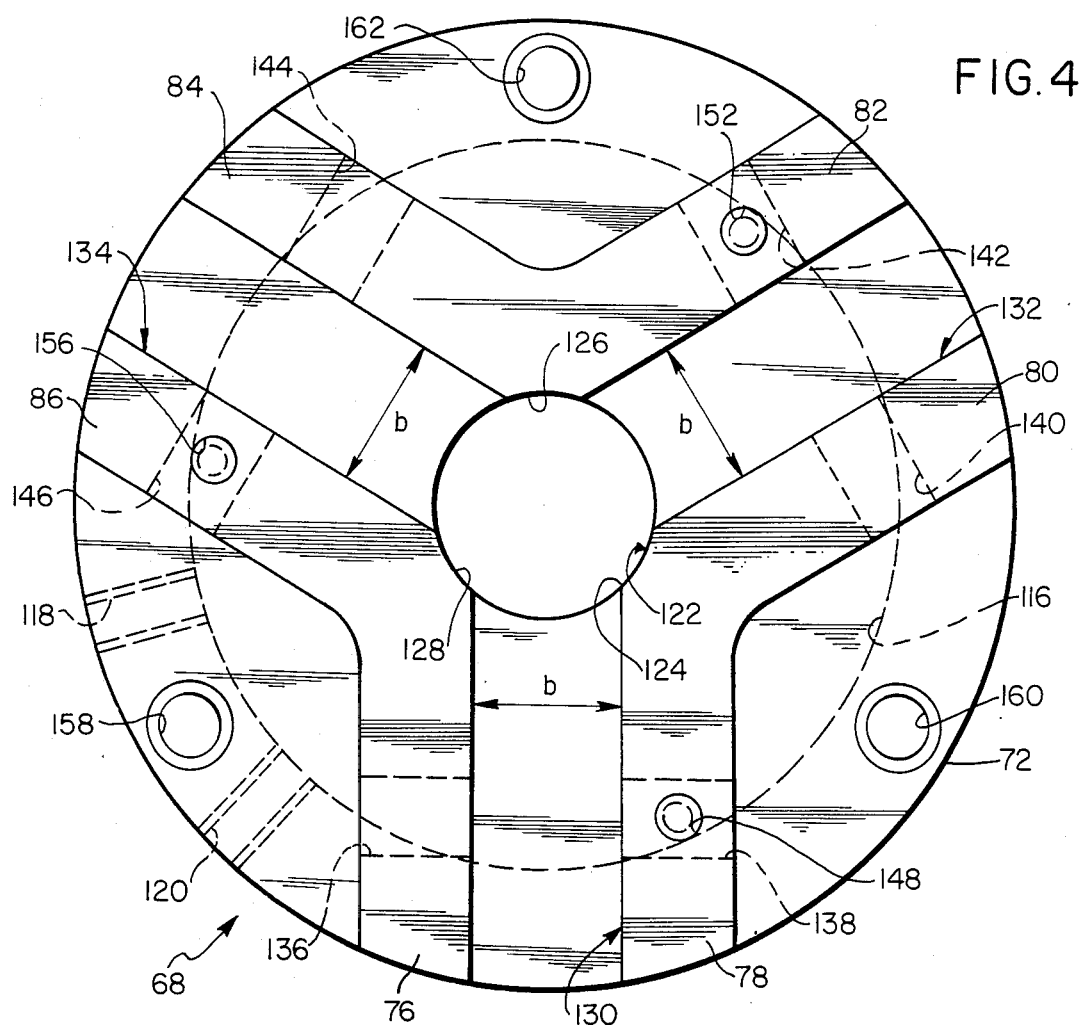
FIG. 4 is a plan view of the housing for the gripper apparatus shown in FIG. 3.
Figure 5:
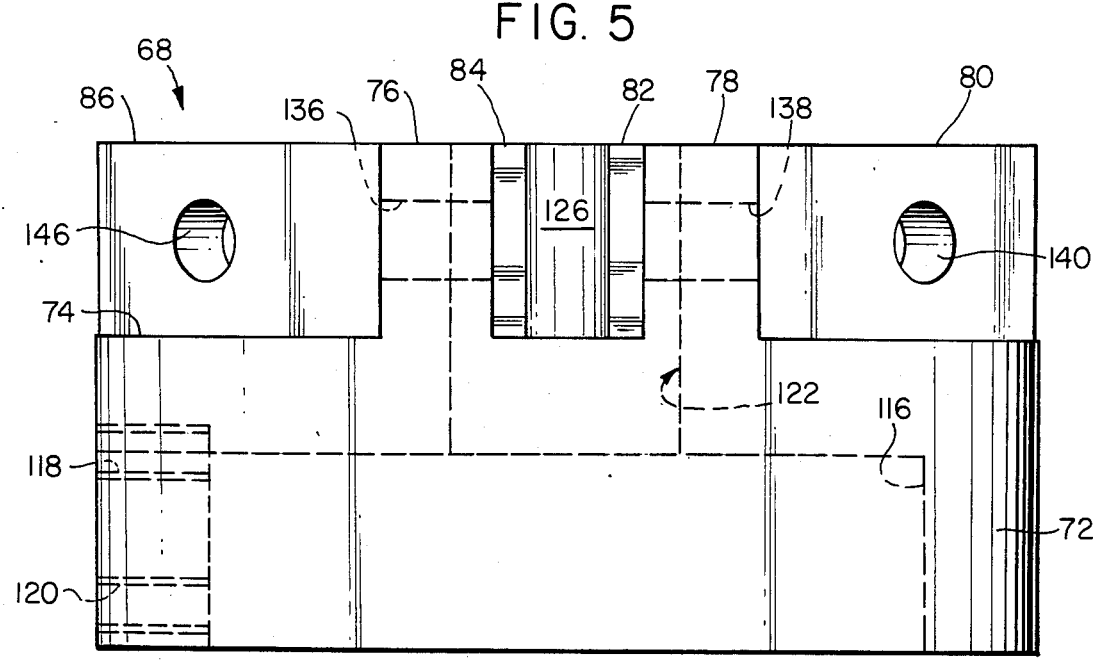
FIG. 5 is an elevational view of the housing shown in FIG. 3.

The housing 68 is shown in greater detail in FIGS. 4 and 5. More particularly, housing 68 includes a concentrically aligned cylindrical piston cavity 116. Fluid ports 118 and 120 extend through the side wall 72 of housing 68 and into the cylindrical piston cavity 116. The fluid ports 118 and 120 are longitudinally spaced from one another so as to selectively control the movement of the actuator piston (not shown) in housing 68 as explained further below.

A concentrically aligned cylindrical actuator channel 122 is disposed in the end of the housing 68 adjacent the jaw guides 76–86. The cylindrical actuator channel 122 defines arcuate surfaces 124, 126 and 128 adjacent the jaw guides 76–86 as shown most clearly in FIG. 4. A cylindrical actuator channel 122 slidably receives a portion of the actuator piston (not shown) as explained further below.

The parallel pairs of jaw guides 76–78, 80–82 and 84–86 define radially aligned jaw channels 130, 132 and 134 respectively. The jaw channels 130–134 are of width "b" which is equal to or slightly greater than the width "a" of the master jaws 88–92 as shown in FIG. 3. As explained further below, the master jaws 88–92 are pivotally mounted in the radially aligned jaw channels 130–134 respectively.

The jaw guides 76–86 are provided with pivot apertures 136–146 as shown most clearly in FIG. 4. The pivot apertures 136–146 define registered pairs of pivot apertures 136–138, 140–142 and 144–146 which are disposed respectively in the pairs of parallel jaw guides 76–78, 80–82 and 84–86. The pivot apertures 136–146 are adapted to receive pivot pins about which the master jaws pivot. The jaw guides 78, 82 and 86 are provided respectively with threaded apertures 148, 152 and 156 respectively which extend into the pivot apertures 138, 142 and 146 respectively. The threaded apertures 148, 152 and 156 are adapted to receive set screws for securely retaining pivot pins in the pivot apertures 136–146.

The housing 68 further is provided with mounting apertures 158, 160 and 162 which extend in a longitudinal direction entirely through the side wall 72. The mounting apertures 158–162 enable mounting of the apparatus on a robotic device. No other electrical, mechanical, hydraulic or pneumatic connection to the robotic device is required.

Figure 6:
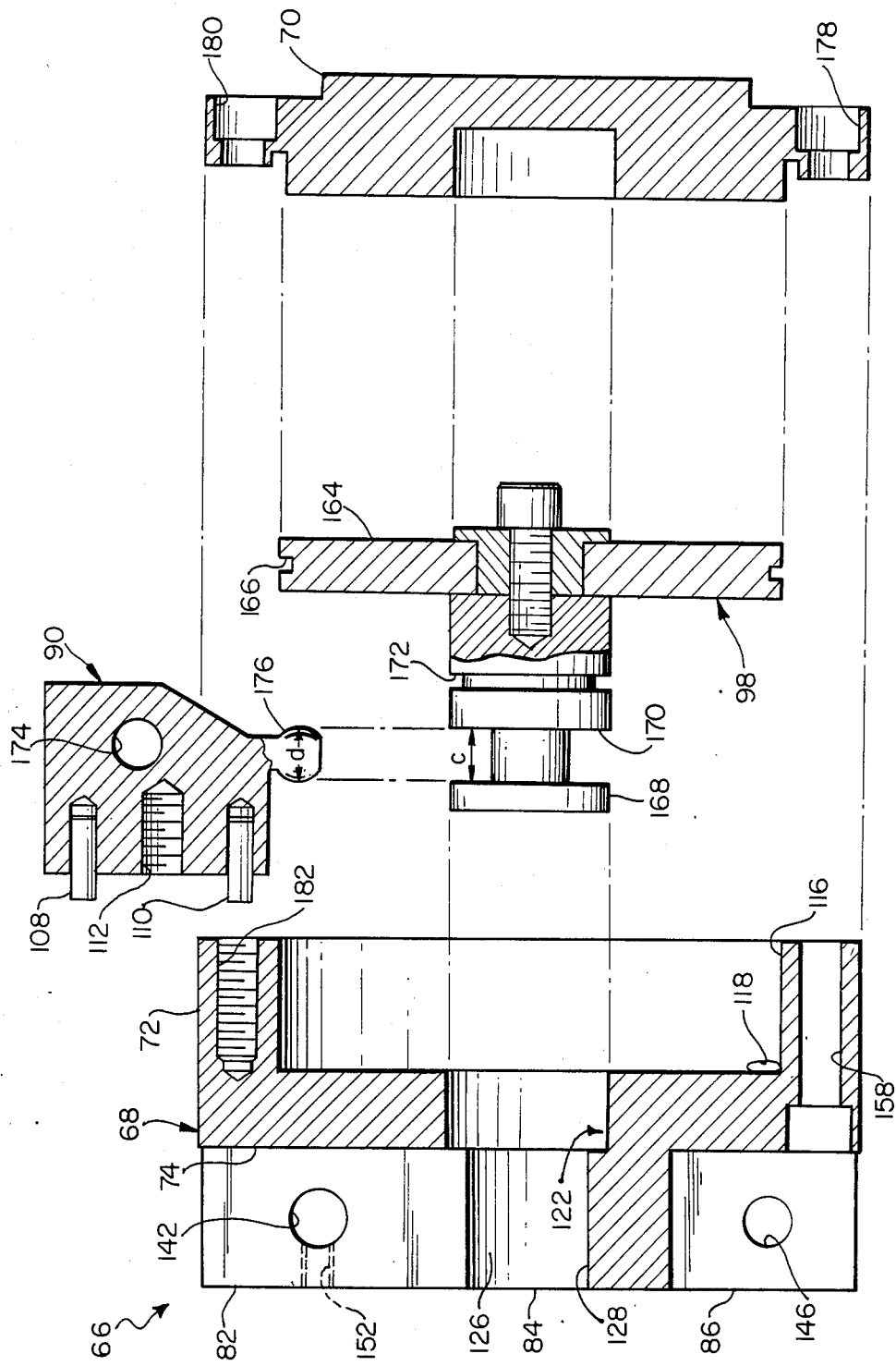
FIG. 6 is an exploded cross-sectional view of the gripper apparatus shown in FIG. 3.
Figure 7:
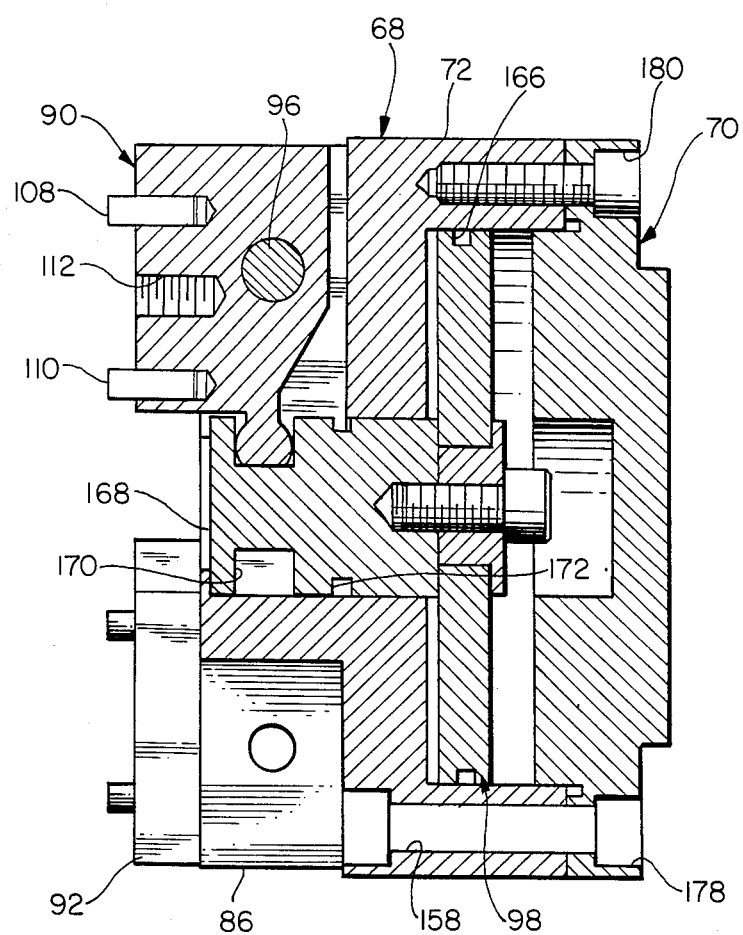
FIG. 7 is a cross-sectional view of the assembled gripper apparatus in FIG. 3.

FIGS. 6 and 7 show the complete apparatus 66. The actuator piston 98 of the apparatus 66 includes a circular disc member 164 dimensioned to be slidably inserted into the piston cavity 116 of housing 68. The disc 164 includes an annular groove 166 which is adapted to receive an O-ring which prevents leakage of hydraulic or pneumatic fluid from the apparatus 66. The actuator piston further includes a cylindrical actuator 168 dimensioned to be slidably inserted in the cylindrical actuator channel 122. The disc 164 and the cylindrical actuator 168 are concentrically disposed relative to one another. The cylindrical actuator is characterized by an annular groove 170 having a longitudinal width "c". As explained further below, the groove 170 is dimensioned to receive a portion of each master jaw 88–92 to cause a pivotal movement thereof.

The actuator piston 98 further includes annular groove 172 disposed intermediate the disc 166 and the groove 170. Annular groove 172 is adapted to receive a second O-ring which will prevent the escape of hydraulic or pneumatic fluid from the apparatus 66.

The master jaw 90, as shown in FIGS. 6 and 7, is substantially identical to the master jaws 88 and 92 also used with apparatus 66. More particularly, the master jaw includes a cylindrical pivot aperture 174 which is dimensioned to receive the pivot pin 96. The master jaw 90 further includes a generally arcuate lever arm 176 having a maximum dimension "d" in the longitudinal direction which is less than the longitudinal dimension "c" of the groove 170 in actuator piston 98. The lever arm 176 is adapted to be received in the annular groove 170. Additionally, the lever arm 176 is adapted to rotate and/or move radially in the groove 170. Thus, on the assembled apparatus 66, as shown in FIG. 7, a movement of the actuator piston 98 in the longitudinal direction will exert forces upon the lever arm 176 which, in turn, will cause the entire master jaw 90 to pivot around pin 96.

The apparatus 66 further includes a cover 70 having a plurality of apertures 178 and 180 extending therethrough. The aperture 178 is disposed to be in line with the mounting aperture 158, which enables the apparatus 66 to be mounted onto a robotic device. The aperture 180 in the cover 70 is disposed to be in line with an aperture 182 extending into side wall 72 of housing 68. A threaded bolt may be extended through aperture 180 and affixed in aperture 182 to securely mount the cover 70 onto the housing 68.

In operation, hydraulic or pneumatic fluid may selectively be urged into or extracted from the piston cavity 116 through either apertures 118 or 120. More particularly, the urging of fluid into the piston cavity 116 through the fluid port 118 and the simultaneous withdrawing of fluid through port 120 will cause the actuator piston 98 to advance toward the cover 70. This movement of actuator piston 98 will cause the lever arm 176 to move toward the rear cover 70 and to pivot about the pivot pin 96. This rotational movement of the master jaw 90 will cause a gripper mounted on dowels 108 and 110 to move radially inwardly for grasping a tool or workpiece. Conversely, fluid may be urged into the piston cavity 116 through port 120 while simultaneously removing fluid through port 118. This particular flow of fluid will cause the actuator piston to move away from the rear cover 70. Consequently the lever arm 176 will be urged away from the rear cover 70 and will rotate relative to the pivot pin 96. This will cause a gripper mounted on dowels 108 and 110 to move radially outwardly thereby releasing a tool or workpiece previously secured in the apparatus 66.

It is to be understood that while the operation of apparatus 66 has been described with respect to master jaw 90, the master jaws 86 and 88 would be pivotally moved in the same manner.

In summary a gripper apparatus is provided for mounting on and for use with a robotic device. The gripper apparatus includes a housing to which a plurality of master jaws are pivotally mounted such that the master jaws are radially aligned relative to one another. The radially innermost portion of each master jaw defines a lever arm which is engaged by an actuator piston. The actuator piston in turn is slidingly disposed within the housing. The apparatus is in communication with a source of hydraulic or pneumatic fluid such that selective application of the fluid will cause slidable movement of the actuator piston within the housing. This slidable movement of the actuator piston, in turn, moves the lever arms of the master jaws relative to their pivotal mounting. Appropriately configured grippers can be mounted to the master jaws and will be moved radially inwardly or outwardly in response to the pivotal motion of the master jaws. The pneumatic or hydraulic control of the subject apparatus is entirely independent of the operation of the robotic device.

While the subject invention has been described and illustrated with respect to certain preferred embodiments, it is understood that various modifications can be made thereof without departing form the spirit of the subject invention which should be limited only by the scope of the appended claims.

What is claimed is:

1. A gripper assembly for a robotic device, said assembly comprising:

a generally cylindrical housing having opposed first and second ends, said first end including a generally cylindrical side wall forming a concentrically aligned cylindrical piston cavity extending into the first end of said housing, said second end of said housing including a plurality of pairs of spaced apart parallel jaw guides with each said pair of jaw guides defining a radially aligned jaw channel, the radially innermost portions of said jaw guides defining a concentrically disposed cylindrical actutor channel extending from said second end and into said piston cavity, the diameter of said actuator channel being smaller than the diameter of said piston cavity;

a unitary master jaw pivotally mounted in each said jaw channel, each said master jaw comprising a planar portion disposed intermediate the corresponding pair of jaw guides, a lever arm extending radially inwardly from said planar portion and into the actuator channel the radially innermost portion of each said lever arm defining an arcuate portion spaced from said planar portion and disposed entirely within said actuator channel;

an actuator piston having a circular disc member slidably mounted in said piston cavity and having a cylindrical actuator slidably disposed within said actuator channel, said cylindrical actuator including a generally annular groove disposed in engagement with the arcuate portion of each of said lever arms; and a rear cover mounted to the first end of said housing and securely covering the piston cavity therein, whereby the longitudinal movement of said actuator piston causes pivotal and radial movement of the arcuate portion of each said lever arm within the annular groove and the simultaneous pivotal movement of the planar portion of each said master jaw within the respective jaw guides of said housing.

2. An apparatus as in claim 1 wherein said housing includes a pair of fluid ports longitudinally spaced from one another on said housing and extending into the piston cavity, said fluid ports being adapted to receive hydraulic or pneumatic fluid for selectively moving the actuator piston within the piston cavity.

3. An apparatus as in claim 1 further including means for mounting a gripper to each said master jaw.

4. An apparatus as in claim 1 wherein said housing and said cover include a plurality of registered apertures adapted to receive bolts for removably mounting said apparatus to the robotic device.

* * * * *